Patented Apr. 4, 1939

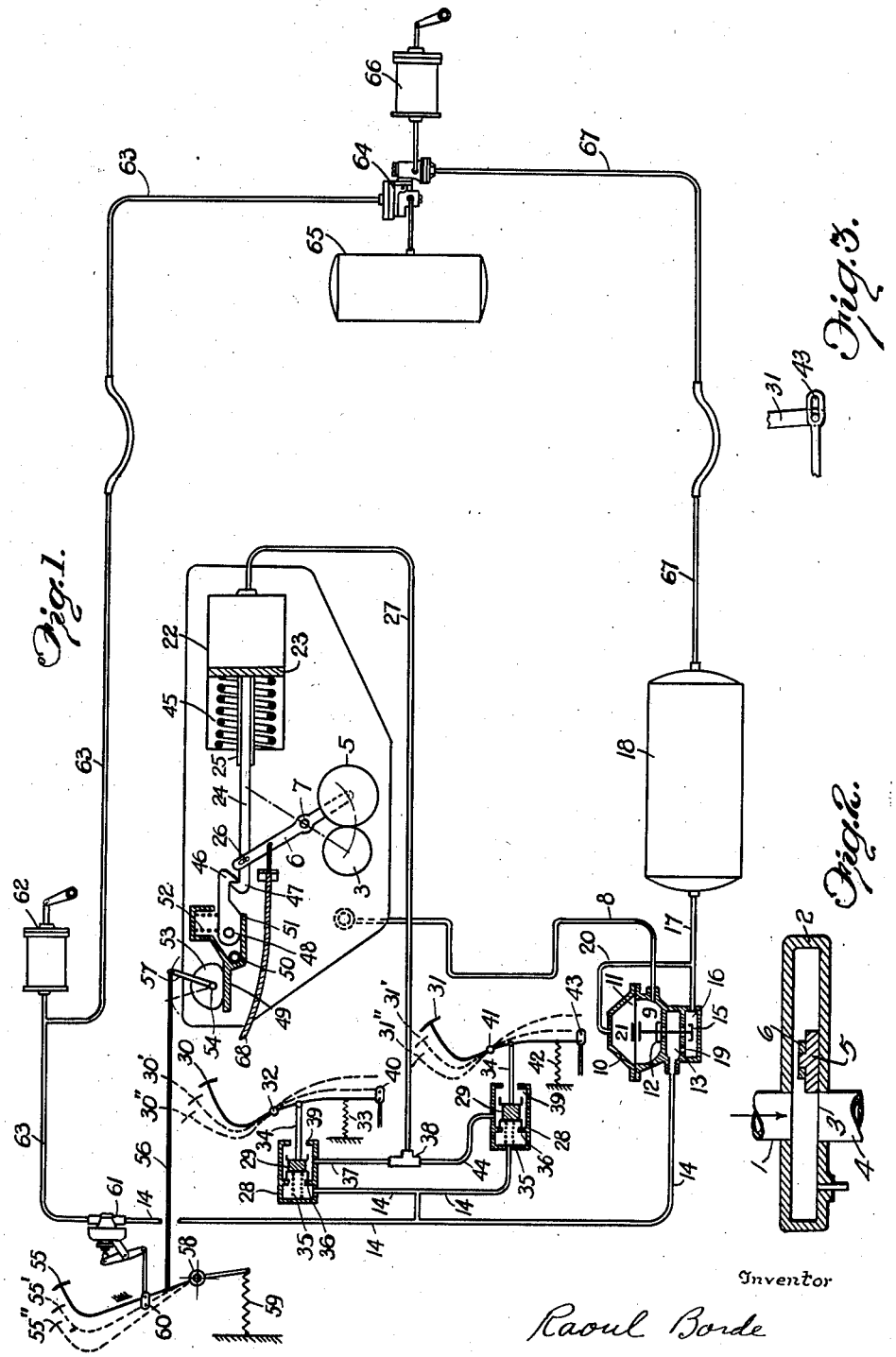

2,152,949

UNITED STATES PATENT OFFICE 2,152,949

FLUID PRESSURE BRAKE SYSTEM

Raoul Borde, Paris, France, assignor to Compagnie des Freins Westinghouse, Paris, France Application December 22, 1936, Serial No. 117,222
In France December 24, 1935

9 Claims. (Cl. 192—.01)

This invention relates to vehicle braking apparatus utilising the engine of the vehicle and of the kind comprising arrangements for obturating the exhaust conduit of the engine, so that the movement of the vehicle is opposed by a retarding force corresponding to the resistance offered by the engine driven as a fluid compressor by the motion of the vehicle, so as to develop in the exhaust conduit, and preferably also in a reservoir, a fluid pressure for actuating a friction brake.

In braking apparatus of this kind the exhaust conduit obturator and fluid pressure friction brake are usually arranged to be controlled by two independent pedals or levers and should the obturator control pedal or lever be actuated by the driver before the friction brake control pedal or lever, not only will the braking, corresponding to the resistance offered by the engine acting as a fluid compressor, be lacking initially, but there is also a risk that the fluid pressure friction brake will be inoperative under these conditions, owing to the obturation of the exhaust conduit being a necessary condition for the development of fluid pressure for actuating the friction brake and the possibility, when a reservoir is provided, of the pressure obtaining in the reservoir having been decreased, for instance by a previous friction brake application, to a value insufficient for braking purposes.

In order that the actuation of the friction brake pedal or lever before the obturator pedal or lever shall result in a certain braking force being exerted, the friction brake pedal or lever may be mechanically connected to the friction braking elements, but as will be appreciated the maximum braking force available in these circumstances, being the maximum force capable of being exerted by the driver through the mechanical brake rigging, would be insufficient in the case of heavy loads, and moreover a trailer vehicle provided with a fluid pressure friction brake would not be braked at all in these circumstances.

According to one feature of the invention, however, the obturator and fluid pressure friction brake are arranged to be controlled by a pedal, lever or the equivalent, the initial movement of which to effect a braking action is arranged to cause the obturator to be actuated so as rapidly to close the exhaust conduit and the further movement of which is arranged to control the operation of a valve device controlling the fluid pressure friction brake whilst the exhaust conduit remains obturated, so as to ensure the availability of fluid pressure for the friction brake whenever required and the avoidance of the disadvantages referred to hereinbefore, whilst rendering the combined braking action simple to control.

When a vehicle provided with braking apparatus of the kind set forth is braked and is on the point of stopping, the driver should first of all actuate the obturator so as to open the exhaust conduit, then actuate the clutch pedal or its equivalent so as to declutch the engine from the transmission members driving the wheels and then release the fluid pressure friction brake, the vehicle then being maintained in its arrested position by means of a stop brake.

If, however, the driver should actuate the clutch pedal so as to declutch the engine before opening the exhaust conduit by appropriately actuating the obturator member, the engine would be stalled.

According to a further feature of the invention, therefore, the initial movement of the clutch pedal or its equivalent to declutch the engine is arranged to cause the obturator to be actuated so as to open the exhaust conduit, the further movement of the said pedal being arranged to effect the declutching of the engine.

So long as the accelerator pedal or its equivalent of the vehicle is depressed, it will be evident that the exhaust conduit should be open and therefore, according to a still further feature of the invention, the initial movement of the accelerator pedal or its equivalent to accelerate the engine is arranged to cause the obturator to be actuated so as to open the exhaust conduit, the further movement of the said pedal being arranged to effect the acceleration of the engine.

Preferably the closing movement of the obturator, which only requires a relatively small effort, is arranged to be effected rapidly by means of spring pressure released by the brake pedal in the first relatively short part of its movement. The reopening movement of the obturator, which necessitates a relatively greater effort owing to the fluid pressure acting thereon, may be arranged to be effected by means of a fluid pressure obturator actuating cylinder which at the same time serves to restore in the spring the energy required for the closing movement. The fluid pressure required for actuating the obturator so as to reopen the exhaust conduit is developed by the engine driven as a compressor, and it will be evident that the required fluid pressure will always be available when the obturator is closed, inasmuch as the closure of the valve implies the progression of the vehicle and operation of the engine as a fluid compressor, a valve device being provided between the exhaust conduit on the one hand and the reservoir and the fluid pressure brake and obturator actuating cylinders on the other hand, which valve device is arranged to render either the exhaust conduit or the reservoir or both of these available as a source of fluid pressure, according to the relation of the values of the pressures obtaining in the exhaust conduit and in the reservoir respectively.

The actuation of the obturator so as to open the exhaust conduit by means of fluid pressure may be arranged to be controlled by means of two fluid pressure valve devices connected in parallel, one controlled by the clutch pedal or its equivalent and the other by the accelerator pedal or its equivalent, so that the initial movement of one or other of the pedals to declutch or accelerate the engine as the case may be will permit fluid pressure to be supplied to the obturator cylinder so as to open the exhaust conduit, this cylinder being vented to atmosphere and the exhaust conduit open, only when both pedals are in their normal positions.

In order that the invention may be readily understood an embodiment will now be described, by way of example, with reference to the accompanying drawing.

In the drawing:

Fig. 1 is a diagrammatic view of a fluid pressure system embodying the principles of the present invention, certain of the parts thereof being shown in section;

Fig. 2 is a sectional view of one of the elements of Fig. 1, and

Fig. 3 is a plan view of a detail.

Referring now to the drawing, the exhaust conduit of the engine (not illustrated in the drawing) is indicated at 1 as leading to a casing 2 having an outlet 3 to a conduit 4 leading to the atmosphere, the outlet 3 being controlled by means of an obturator 5 arranged to be operated so as to open and close the outlet by means of an arm 6 adapted to be oscillated around a fixed pivot 7.

When the outlet 3 is closed by obturator 5, fluid is compressed in the exhaust conduit 1 and casing 2 and delivered, through a pipe 8 to a chamber 9 of a valve device 10.

The valve device 10 comprises a casing divided into two chambers by a flexible diaphragm 11 carrying a valve element 12 controlling communication between the chamber 9 and a chamber 13 connected to pipe 14, and a valve element 15 controlling communication between the chamber 13 and a chamber 16 connected by a pipe 17 to a reservoir 18, a relatively restricted permanently open port 19 being provided between the chambers 13 and 16, and the pipe 17 being connected by a pipe 20 to a chamber 21 above the diaphragm 11.

The obturator 5 is arranged to be moved to its normal or open position, in which it is illustrated by means of an obturator actuating cylinder 22 containing a piston 23, the piston rod 24 of which is located in a guide 25 and coupled by a pin and slot connection 26 to the arm 6 of the obturator 5. The piston 23 is moved to its left hand position in which the obturator 5 is in its open position as shown in the drawing by the supply of fluid pressure to the cylinder 22 through a pipe 27 from the pipe 14 under the control of one or other of two valve devices 28.

These valve devices are exactly similar and comprise double beat valve elements 29 arranged to be controlled individually by the clutch and accelerator pedal levers 30 and 31 respectively.

The clutch pedal lever 30 is mounted on a fixed pivot 32 and normally under running conditions is held in the position shown in the drawing by means of a spring 33. In this position the pedal lever 30 holds the valve element 29 on its left hand seat 36 through the intermediary of a rod 34 against the action of a spring 35. Under these conditions the pipe 14 is isolated by the valve element 29 whilst a pipe 37 leading to a double check valve 38 connected to the pipe 27 is vented to atmosphere past the right hand seat 39 of the valve device 28. The double check valve 38 may be constructed in any well known manner such as, for example, is illustrated in Fig. 2 of the patent to Stephen Vorech et al., No. 2,041,884, dated May 26, 1936. The clutch pedal lever is connected to the clutch through a pin and slot connection 40, and the initial movement of the clutch pedal lever to the position 30' against the action of the spring 33 does not influence the clutch but permits the spring 35 to move the valve element 29 from its left hand seat 36 to its right hand seat 39, so as to cut off communication between the pipe 37 and the atmosphere and establish communication between the fluid pressure pipe 14 and the pipe 37. Further movement of the clutch pedal lever from the position 30' to the position 30" effects the disengagement of the clutch of the vehicle.

Similarly the accelerator pedal lever 31 which is mounted on a fixed pivot 41 and held in the position shown in the drawing by a spring 42 is connected to the accelerator through a pin and slot connection 43. The initial movement of the accelerator pedal lever 31 to the position 31' permits the spring 35 of the valve device 28 associated with this pedal lever to move the valve element from its left hand seat 36 to its right hand seat 39 so as to cut off communication between the atmosphere and a pipe 44 connected to the double check valve 38 and establish communication between the fluid pressure pipe 14 and the pipe 44. The double check valve 38 may be constructed as shown at 13 in the patent to Stephen Vorech et al. No. 2,041,884, dated May 26, 1936.

A spring 45 is associated with the piston 23 of the obturator actuating cylinder, this spring serving rapidly to close the obturator 5 so as to close the exhaust outlet 3 when permitted to do so.

As shown in the drawing, the spring has been compressed by the supply of fluid pressure through one of the valve devices 28 to the cylinder 22 owing to a previous actuation either of the clutch pedal lever 30 or of the accelerator pedal lever 51. The release of these two pedal levers 30, 31 so that they have assumed the positions shown in full lines in the drawing, has permitted the fluid pressure in the cylinder 22 to vent to atmosphere through the pipe 27, but the piston 23 is held in its left hand position against the action of the spring by a catch member 46 co-operating with a locking projection constituted by the upturned end 47 of the piston rod 24 so that the obturator 5 is held in its open position. The catch member 46 is pivotally mounted at 48 on a lever 49 adapted to oscillate about a fixed pivot 50 and is arranged to be held against a stop 51 on the lever 49 by a spring 52. Adapted to co-operate with the lever 49 is a cam 53 adapted to be oscillated around a fixed pivot 54 by means of the brake pedal lever 55 through the intermediary of a member 56 and arm 57.

The brake pedal lever 55 is mounted upon a fixed pivot 58 and arranged to be held in the position shown in the drawing by a spring 59. This brake pedal lever is coupled by means of a pin and slot connection 60 to a brake controlling valve device 61. Initial movement of the brake pedal lever to the position 55' causes the cam 53 to be rotated around its pivot 54 in an anti-clockwise direction and rotate the lever 49 in the same direction around its pivot 50 so as to release the catch member 46 from the locking projection 47 on the piston rod 24. Further movement of the brake pedal lever from the position 55' to 55'' causes the application of the brakes through the intermediary of the control valve device 61, which is arranged to control communication between a brake cylinder 62 and the atmosphere on the one hand and between the brake cylinder 62 and the fluid pressure pipe 14 on the other hand.

The brake cylinder 62 is on a tractor vehicle and is connected to the control valve device 61 by a pipe 63 which is also connected through flexible pipe connections to a control valve device 64 on a trailer vehicle, adapted to control the supply of fluid from a reservoir 65 on the trailer vehicle to a brake cylinder 66 thereon and the release of fluid therefrom in accordance with the supply and release of fluid to and from the brake cylinder 62, the reservoir 65 on the trailer vehicle being arranged to be charged from the reservoir 18 on the tractor vehicle through a pipe 67.

The pin and slot connections 40, 43 and 60 may be constructed in any suitable manner, such, for example, as illustrated in Fig. 3.

The operation of the apparatus described hereinbefore is as follows:

In the drawing the apparatus is illustrated with the parts in the positions which they assume when the vehicle is at rest. The brake, clutch and accelerator pedal levers 55, 30 and 31 are released and held in the positions shown in full lines in the drawing by the springs 59, 33 and 42 respectively, so that the cam 53 permits the catch member 46 to engage with the locking projection 47 on the piston rod 24 and hold the piston 23 in its left hand position against the action of the spring 45, the obturator 5 under these conditions leaving a free passage for the exhaust gases through the opening 3 from the pipe 1 to the pipe 4 leading to the atmosphere. The cylinder 22 is vented to the atmosphere through the pipe 27, double check valve 38 and one of the valve devices 28.

In order to drive the vehicle forwards the driver performs the usual operations with the clutch pedal lever 30 and accelerator pedal lever 31 and it will be seen that depression of these levers will cause the fluid pressure pipe 14 to be connected to the pipe 27 through one or other valve device 28 and the double check valve 38, but whether or not there is any fluid pressure in the pipe 14 the obturator actuating cylinder piston 23 will not be moved as it is already in its left hand position.

Supposing now that the driver wishes to brake the vehicle on a hill, he will release the accelerator pedal lever and depress the brake pedal lever 55. Initial movement of the brake pedal lever to the position 55' will, through the intermediary of the member 56 and arm 57 rotate the cam 53 in an anticlockwise direction so as to rotate the lever 49 in the same direction and release the catch member 46 from the locking projection on the piston rod 24, with the result that the piston 23 and piston rod 24 will be moved rapidly to the left so as rapidly to rotate the arm 6 in a clockwise direction and close the outlet 3 by the obturator 5.

The engine now operates as a compressor driven by the motion of the vehicle and air compressed in the pipe 1 is supplied through the pipe 8 to the chamber 9 of the valve device 10. The pressure developed in the chamber 9 raises the diaphragm 11 and seats the valve element 15 whilst unseating the valve element 12 and establishing communication between the pipe 8 and the pipe 14.

Further movement of the brake pedal lever towards the position 55'' will operate the brake control valve device 61 to cut off communication between the brake cylinder 62 and the atmosphere and establish communication between the pipe 14 and the brake cylinder 62. Fluid pressurse is then supplied by the engine acting as a compressor through the pipes 8, 14 and 63 to the brake cylinder to effect a braking of the vehicle.

At the same time the reservoir 18 is charged with compressed fluid through the relatively restricted port 19 and when the pressure in the reservoir 18 and chamber 21 of the valve device 10 is equal to the pressure in the chamber 9, the diaphragm 11 floats in its mean position with the two valves 12 and 15 unseated so that compressed fluid direct from the pipe 8 or from the reservoir 18 is available in the pipe 14. If for any reason the pressure in the pipe 8 and chamber 9 should fall below that in the reservoir 18 and chamber 21 the diaphragm will be depressed and the valve element 12 seated while the valve element 15 is unseated, so as to render the pressure in the reservoir 18 only available in the pipe 14.

At the same time fluid is supplied through the pipe 63 to the valve device 64 and effects the braking of the trailer vehicle by means of the brake cylinder 66. The reservoir 65 on the trailer vehicle is charged from the reservoir 18 through pipe 67, and should the trailer vehicle break away from the tractor vehicle, the rupture of the pipe 67 would cause the valve device 64 to operate so as to effect an automatic application of the brakes on the trailer vehicle, fluid being supplied to the brake cylinder 66 from the reservoir 65 in these circumstances.

In order to release the brakes the driver releases the brake pedal lever 55 and the brake control valve 61 is accordingly operated to cut off connection between the pipes 14 and 63 and establish communication between the pipe 63 and the atmosphere, the final stage in the release movement of the pedal lever 55 rotating the cam 53 in a clockwise direction so as to permit the lever 49 to rotate also in a clockwise direction back to the position in which it is illustrated in the drawing. The driven then depresses the accelerator pedal lever 31 in order to proceed on his way and the initial movement of this lever, through the intermediary of the double beat valve element 29, cuts off communication between the pipe 44 and the atmosphere and establishes communication between the fluid pressure pipe 14 and the pipe 44. Fluid pressure is then supplied from the pipe 14 through the pipe 44 and past the double check valve 38 to the cylinder 22 through the pipe 27. The fluid pressure acting on the piston 23 moves it to its left hand position against the action of the spring 45 and the piston 23 is held in its left hand position once more by the catch member 46 engaging the locking projection 47, under which conditions the outlet 3 is again opened by the obturator member 5 and the energy, which is required subsequently to reclose the obturator rapidly, is stored in the spring 45.

If on the other hand the driver wishes to stop, he releases the accelerator pedal lever 31 and depresses the brake pedal lever 55 to the end of its stroke. During the first part of the movement of the pedal lever 55 the obturator 5 is closed as described hereinbefore and during the second part of the movement the brake is applied. Now just before the vehicle comes to rest the driver should depress the clutch pedal lever 30 so as to declutch the engine and in order to avoid stalling the engine under these conditions the obturator 5 should be in its open position. Accordingly the first part of the movement of the pedal lever is arranged to have a similar effect to that of the first part of the movement of the accelerator pedal, namely, the supply of fluid pressure to the cylinder 22. Fluid is in this case supplied from the pipe 14 through the valve device 28, pipe 37, double check valve device 38 and pipe 27 to the cylinder 22 and moves the piston 23 and piston rod 24 to their left hand positions in which the obturator 5 opens the outlet 3.

As soon as the vehicle has stopped the driver releases the brake pedal lever 55, and the piston 23 and piston rod 24 are held once more in their left hand positions by the catch member 46 co-operating with the locking projection, whereupon the driver can abandon the clutch pedal level 30 and apply another brake to hold the vehicle at rest.

Thus whilst permitting the driver to respond solely to his natural reflex actions as regards the usual and habitual sequential operations of the three pedal levers referred to, there is no possibility of failure to obtain a braking action owing for instance to lack of pressure in the reservoir as the fluid pressure developed by the engine is available directly as a source of braking pressure in view of the fact that the obturator will always close the outlet from the exhaust pipe just prior to the operation of the brake control valve; nor can the driver inadvertently stall the engine by leaving the obturator closed when he stops the vehicle if he performs the customary operation of declutching just prior to stopping completely, for the action of declutching ensures the opening of the outlet from the exhaust pipe; in order to ensure the reopening of the outlet of the exhaust pipe after a partial braking (not a braking to a standstill), the initial movement of the accelerator pedal lever is arranged automatically to supply fluid to the obturator actuating cylinder so as to open the obturator.

If some time after the vehicle had been brought to rest, the fluid pressure system were exhausted and the brake pedal lever 55 were depressed the obturator 5 would be closed by the spring 45, and in these circumstances would have to be reopened by hand. Accordingly a flexible control member 68 is associated with the arm 6 of the obturator 5 whereby the latter may be moved from a convenient control position to its open position in which it is held by the catch member 46.

As will be evident therefore, the invention is not limited to the particular construction and arrangements of the parts hereinbefore described which may be varied as desired to suit particular requirements without exceeding the scope of the invention.

Having now described my invention, what I claim as new and desire to secure by Letters Patent is:

1. In a fluid pressure brake system for a vehicle having an engine and an exhaust conduit therefor, a normally open valve for closing said conduit, means for biasing said valve toward closed position, a fluid pressure actuator for the vehicle brakes, means including a control valve operable for conducting fluid pressure from said exhaust conduit to said actuator for effecting a brake application, a movable member for operating said control valve, and means controlled thereby and operable on initial movement thereof for rendering said biasing means effective for closing said first named valve.

2. In a fluid pressure brake system for a vehicle having an engine, an exhaust conduit therefor and a clutch, a normally open valve for closing said conduit, means for biasing said valve toward closed position, a fluid pressure actuator for the vehicle brakes, means including a control valve operable for conducting fluid pressure from said conduit to said actuator for effecting a brake application, a movable member for operating said control valve, means operable on initial movement of said member and prior to operation of said control valve for rendering said biasing means effective for closing said first named valve, a clutch control element movable for disengaging and engaging said clutch, and means controlled thereby and operable on initial movement thereof for overcoming said biasing means and opening said first named valve.

3. In a fluid pressure brake system for a vehicle having an engine, an exhaust conduit therefor and a throttle valve, a normally open valve for closing said conduit, means for biasing said valve toward closed position, a fluid pressure actuator for the vehicle brakes, means including a control valve for conducting fluid pressure from said conduit to said actuator for effecting a brake application, a movable member for operating said control valve, means operable on initial movement of said member and prior to operation of said control valve for rendering said biasing means effective for closing said first named valve, a throttle control element movable for opening and closing said throttle, and means controlled by said element and operable on initial movement thereof for overcoming said biasing means and opening said first named valve.

4. In a fluid pressure brake system for a vehicle having an engine and an exhaust conduit therefor, a valve for closing said conduit, resilient means for biasing said valve toward closed position, a fluid pressure actuator for the vehicle brakes, means including a control valve operable for conducting fluid pressure from said conduit to said actuator for effecting a brake application, a movable member for rendering said resilient means ineffective and operable on initial movement of said member and prior to operation of said control valve thereby for rendering said resilient means effective for closing said first named valve.

5. In a fluid pressure brake system for a vehicle having an engine and an exhaust conduit therefor, a normally open valve for closing said conduit, resilient means for biasing said valve toward closed position, a fluid pressure actuator for the vehicle brakes, means including a control valve for conducting fluid pressure from said conduit to said actuator for effecting a brake application, a movable member for operating said control valve, means for normally rendering said resilient means ineffective and operable on initial movement of said member and prior to operation of said control valve thereby for rendering said resilient means effective for closing said first named valve, and means including a fluid motor operable for compressing said resilient means and restoring said valve to normally open position.

6. In a fluid pressure brake system for a vehicle having an engine, an exhaust conduit therefor, a clutch and a throttle valve, a valve for closing said conduit, resilient means for moving said valve to closed position, a fluid motor for moving said valve to open position, a fluid pressure actuator for the vehicle brakes, means including a control valve for conducting fluid pressure from said conduit to said actuator for effecting a brake application, retaining means for normally rendering said biasing means ineffective, a control member for said control valve operable on initial movement for releasing said retaining means and operable on further movement for operating said control valve for effecting a brake application, a control member for the clutch, a control member for the throttle, and means including a plurality of control valves associated with said clutch and throttle control members operable on initial movement of either of said members for conducting fluid pressure from said conduit to said fluid motor for opening said first named valve and operable on return of said members to release position for exhausting fluid pressure from said motor.

7. In a fluid pressure brake system for a vehicle having an engine and an exhaust conduit therefor, a normally open valve for closing said conduit, a spring for urging said valve toward closed position, releasable latch mechanism for preventing closure of the valve by said spring, a fluid pressure actuator for the vehicle brakes, means including a control valve operable for conducting fluid pressure from said conduit to said actuator for effecting a brake application, a control valve actuating member having a connection with said latch mechanism and operable on initial movement thereof for releasing said latch and permitting closure of said first named valve by said spring, and means including a fluid motor operable thereafter for compressing said spring and returning said valve to open position.

8. In a fluid pressure brake system for a vehicle having an engine and an exhaust conduit therefor, a normally open valve for closing said conduit, means for biasing said valve toward closed position, a fluid pressure actuator for the vehicle brakes, a reservoir for fluid pressure, valvular means for controlling the flow of fluid pressure to and from said actuator, means including a control member for said valvular means operable on initial movement thereof for rendering said biasing means effective for closing said valve, and control valve means having connections with said conduit, reservoir and valvular means and operable in response to variations in pressure differential between said conduit and reservoir for correspondingly establishing or disestablishing connection between said conduit and reservoir.

9. In a fluid pressure brake system for a vehicle having an engine, an exhaust conduit therefor, a clutch and a throttle valve, a brake actuator, a fluid pressure reservoir, control valve means having connections with said conduit, actuator and reservoir and responsive to pressure differentials between said conduit and reservoir for controlling the flow of pressure therebetween, valvular means associated with said actuator connection for controlling the flow of fluid pressure to and from the actuator, a normally open valve for closing said exhaust conduit whereby fluid pressure is stored therein by the engine, resilient means for biasing said valve toward closed position, latch means for retaining said valve in open position, a fluid motor for moving said valve to open position, a control member for said valvular means having a connection with said latch means and operable on initial movement thereof for releasing said resilient means, a throttle control member, a clutch control member, and control valves having connections with said reservoir and fluid motor and operable on initial movement of one or both of said last named members irrespective of the position of said first named member for establishing a connection between said reservoir and fluid motor, whereby the exhaust conduit valve is moved to open position.

RAOUL BORDE.